UNITED STATES PATENT OFFICE.

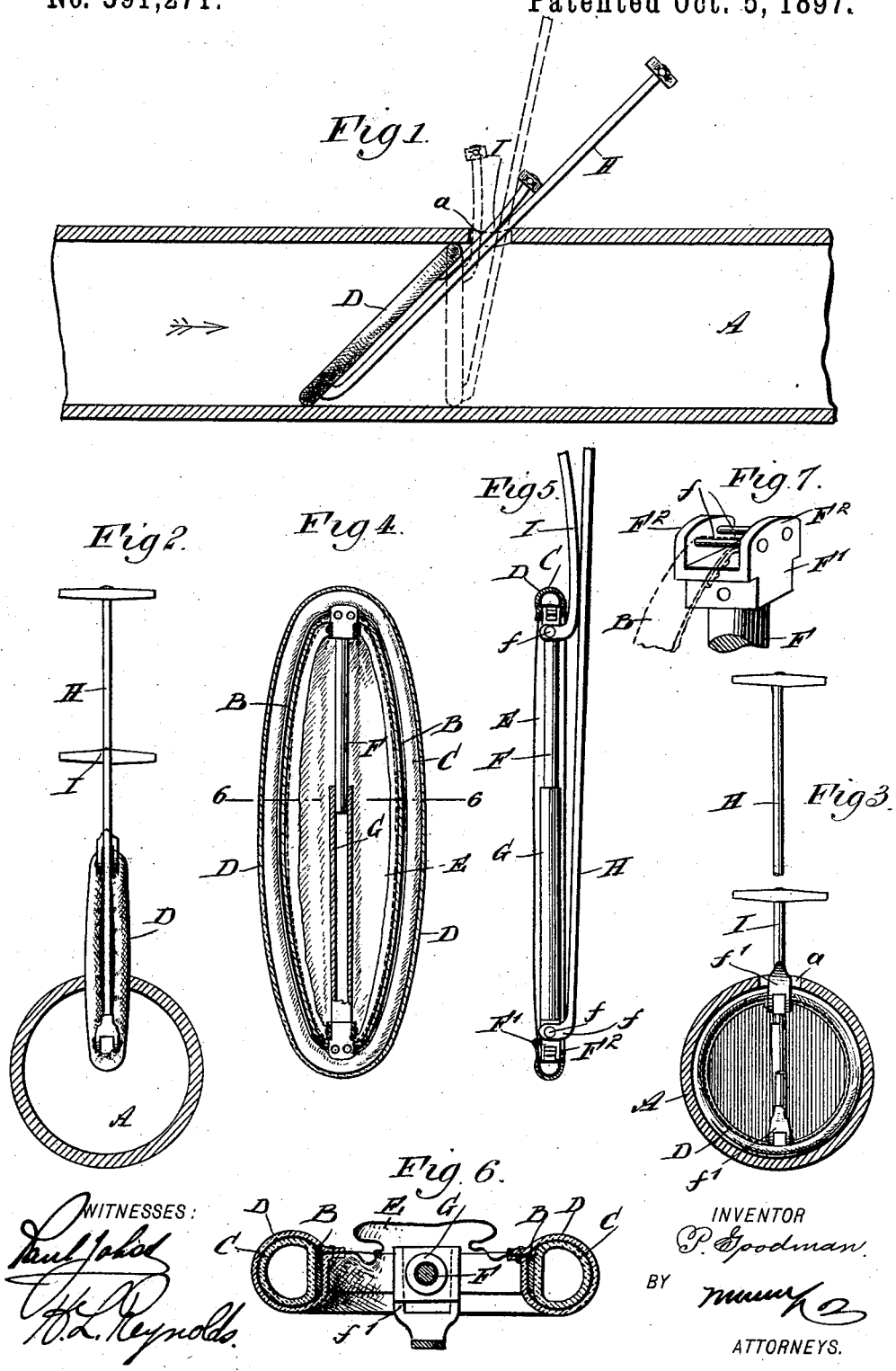

PATRICK GOODMAN, OF NEW YORK, N. Y.

GAS-MAIN STOPPER.

SPECIFICATION forming part of Letters Patent No. 591,271, dated October 5, 1897.

Application filed March 9, 1897. Serial No. 626,600. (No model.)

*To all whom it may concern:*

Be it known that I, PATRICK GOODMAN, of New York city, in the county and State of New York, have invented a new and Improved Gas-Main Stopper, of which the following is a full, clear, and exact description.

My invention relates to an improvement in gas-main stoppers or devices intended to temporarily stop a main and prevent the flow of gas therein.

The device consists, essentially, of spring-bars connected at their ends, covered by a yielding packing, and having a flexible diaphragm attached thereto and adapted to stretch across the pipe.

The device is inserted through a hole in the side of a pipe while its opposite sides are pressed toward each other. After being inserted in the pipe it is expanded to a circular shape, extending at the time across the pipe, and is held in place by friction against the sides of the pipe exerted by the springs in the device. For operation in such position it is supplied with rods or handles, which are attached thereto from the rear side and entirely clear the ring at the side.

The invention consists in the construction and combination of parts, as will be fully described hereinafter and then pointed out in the appended claims.

Reference is to be had to the accompanying drawings, forming a part of this specification, in which similar characters of reference indicate corresponding parts in all the views.

Figure 1 is a longitudinal section of a pipe, showing my device as being applied thereto. Fig. 2 is a cross-section of a pipe, showing my device as being inserted through a hole in the side. Fig. 3 is a similar view showing my device in position. Fig. 4 is an enlarged detail of the ring or stopper proper, showing the casing surrounding the tube or packing in section. Fig. 5 is a longitudinal section taken through the ring at one side of the sliding bars. Fig. 6 is a cross-section upon the line 6 6 of Fig. 4, and Fig. 7 is a perspective detail showing the end of one of the sliding bars and the pivotal connection of the springs thereto.

In working about gas-mains it is often necessary to attach pipes thereto or to do other work which necessitates a stoppage of the flow of gas for greater or less periods of time. This stoppage has previously been accomplished by various means, which are all of them more or less objectionable. The object of my invention is to produce a device which will secure this result quickly and efficiently and at the same time be simple and not liable to get out of order.

Two flat steel springs B are provided, which have eyes at their ends adapted to receive a pivot-pin. The springs B are pivoted at each end to two rods F and G, the latter being a tube receiving the former and thus telescoping. The rods F and G are provided with heads F', which have flanges $F^2$, and two pivot-pins $f$, entering the eyes in the ends of the springs B. The springs B are slightly bent or curved throughout their length, but are capable of compression, so that they may be forced closely to the center against the rods F and G.

Outside of the springs B is provided some form of yielding or elastic packing. I have shown a rubber tube used for this purpose, although any other material which will form a yielding packing may be used instead. Outside of this tube C and inclosing within it the springs B is a casing D. To this outer casing D is attached a flexible diaphragm E, which is formed of cloth, leather, or any other suitable material, being treated, if necessary, in such a manner as to make it to all practical purposes impervious to gas. This diaphragm E is made, in the direction of the sliding bars F and G, larger than the diameter of the pipe to which the device is to be applied. In the other direction it is made so that it will be drawn tight when the sides are separated, so as to engage the interior surface of the pipe.

The sliding bars F and G have bars or handles attached thereto just inside of their outer ends. A bar or handle I is attached by a pin $f$ to the bar F and a bar or handle H is attached by a similar pin $f$ to the outer end of the bar G. These handle-bars I and H are bent near the ends attaching them to the sliding bars, so that they will extend to the rear sufficiently to entirely clear the spring-bars and their packing. The handle-bar I is made comparatively short and may be provided with a cross-bar to be engaged by the hand upon its outer end. The handle-bar H is considerably longer and may be similarly provided with a cross-bar for a handle.

My device is used as follows: A hole $a$ is made in the side of a pipe or main A, and it is desired to close the pipe at one side of this hole, so that the gas will not escape. When the hole is made, the sides of the device are brought close together and inserted through the hole in the pipe. The device will, when first inserted, occupy an angular position, as shown in full lines in Fig. 1. It is so inserted that the ring D will be next to the source of gas-supply. This leaves the ring to engage the interior surface of the pipe entirely at one side of the entrance-hole $a$. This is possible by reason of the rearward bend of the pivoted ends of the handle-bars I and H. While in this position the short handle I is held firmly, while the ring is compressed by drawing upon the longer handle H. At the same time the bars are straightened to the position shown in dotted lines in Fig. 1. In doing this the spring-bars have been forced outward until the ring assumes a circular position, pressing closely against the interior surface of the pipe. This position is shown in Fig. 3.

The device will be made of different sizes for different-sized mains, and will be made of such a size that the springs will exert sufficient pressure against the inner surface of the pipe to hold the ring securely in place against the pressure of the gas. As the pressure of the gas is never very great, this will not require very strong springs.

The device will entirely close the flow of gas in the pipe, making it possible for the workmen to proceed with their work without the inconvenience of escaping gas, which in many cases is a very important consideration, as the location of gas-pipes frequently makes it impossible to ventilate about them in such a way as to carry off the gas as fast as it would otherwise escape. Unless this is done the workmen will very quickly become overpowered with the gas and be unable to do any work even if their lives are not endangered.

Having thus described my invention, I claim as new and desire to secure by Letters Patent—

1. A gas-main stopper, comprising two sliding bars, two spring-bars having one end of each pivoted to one end of one sliding bar and their other ends pivoted to the opposite end of the other sliding bar, a yielding packing outside the spring-bars, a sheet of flexible material attached to the outer packing and permitting the spring-bars to assume a circular position, and operating-arms pivoted to the sliding bars, substantially as described.

2. A gas-main stopper, comprising two sliding bars, two spring-bars pivoted at one end to the outer end of one sliding bar and at their other end to the opposite end of the other sliding bar, a yielding packing outside of the spring-bars, a sheet of flexible material attached to the outer packing, and an arm pivoted to each of the sliding bars having offsets or bends near said pivots, substantially as described.

3. A gas-main stopper, comprising connected spring-bars adapted to lie parallel or be bent into a circle, a sheet of flexible fabric connecting the same, telescoping bars to the opposite end of which the springs are pivoted, and arms connected to the telescoping bars from the rear and inner sides and adapted to compress or extend the springs, substantially as described.

4. A gas-main stopper, comprising two spring-bars pivoted at their ends, packing on the outer sides thereof, a flexible diaphragm connected thereto, longitudinally-sliding bars pivoted to the ends of the springs, and rods pivoted to the sliding bars, said rods being bent rearwardly or offset near said pivots, substantially as described.

5. A gas-main stopper, comprising an expansible and compressible ring, a flexible diaphragm connected thereto, and bars pivotally attached at opposite points to said ring and curved or offset near said pivots so as to pass entirely to the rear of the ring when placed parallel with the plane thereof, substantially as described.

PATRICK GOODMAN.

Witnesses:
H. L. REYNOLDS,
JNO. M. RITTER.